United States Patent [19]

Rüetschi

[11] 4,172,183
[45] Oct. 23, 1979

[54] ALKALINE PRIMARY CELL
[75] Inventor: Paul Rüetschi, Yverdon, Switzerland
[73] Assignee: Leclanché S.A., Yverdon, Switzerland
[21] Appl. No.: 900,271
[22] Filed: Apr. 26, 1978
[30] Foreign Application Priority Data Apr. 28, 1977 [CH] Switzerland .......................... 5302/77

[51] Int. Cl.² .............................................. H01M 6/06
[52] U.S. Cl. .................................. 429/128; 429/144; 429/162; 429/224; 429/249
[58] Field of Search ............... 429/224, 206, 230, 222, 429/232, 128, 144, 162, 185, 249, 254, 219

[56] References Cited
U.S. PATENT DOCUMENTS

| | | | |
|---|---|---|---|
| 2,591,532 | 4/1952 | Fox | 429/224 |
| 3,600,231 | 8/1971 | Dawson | 429/206 |
| 3,657,018 | 4/1972 | Ruetschi | 429/223 |
| 3,920,478 | 11/1975 | Kozawa | 429/206 |
| 3,956,018 | 5/1976 | Kozawa | 429/206 |
| 3,961,985 | 6/1976 | Takamura et al. | 429/224 X |

Primary Examiner—Anthony Skapars
Attorney, Agent, or Firm—Lockwood, Dewey, Alex & Cummings

[57] ABSTRACT

An alkaline primary cell comprising a positive electrode having an upper layer, facing the negative electrode, of electrolytic γ-manganese dioxide to which 6–16% of graphite powder having a broad grain-size range has been added as a conducting additive. Disposed beneath this upper layer is at least one further layer containing γ-manganese dioxide, mercuric oxide, or monovalent silver oxide having a higher apparent specific gravity than the upper layer. A separator comprising at least one membrane layer is situated above the positive electrode.

17 Claims, 1 Drawing Figure

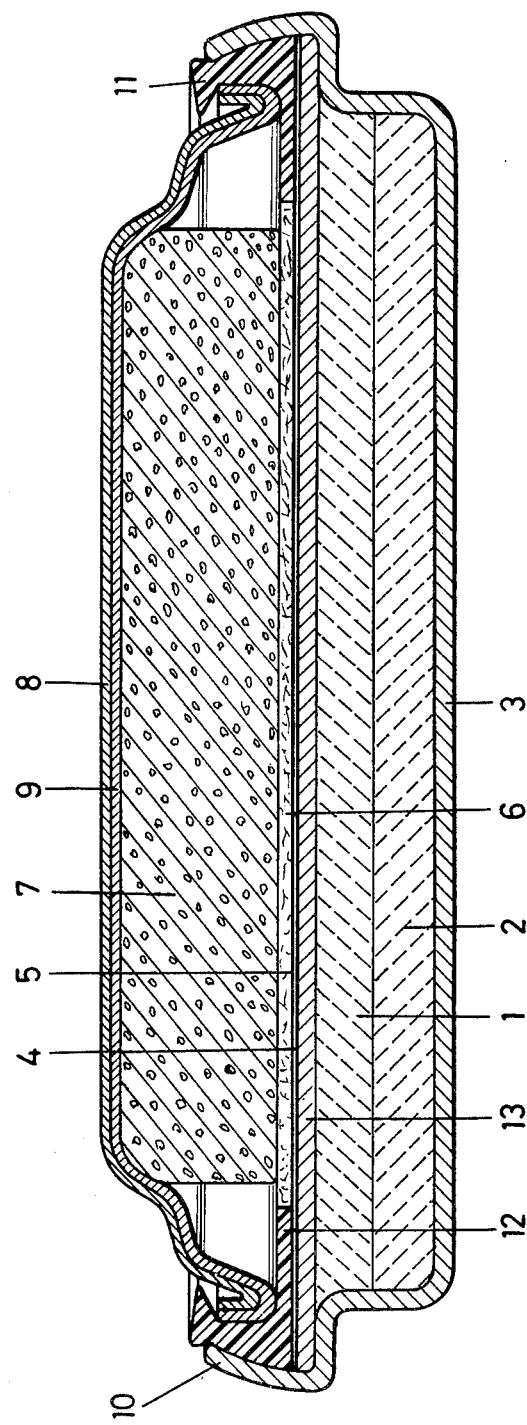

ALKALINE PRIMARY CELL

This invention relates to a special primary cell of the type containing an alkaline electrolyte, γ-manganese dioxide as a positive active material, and amalgamated zinc powder or finely divided cadmium as a negative electrode material.

Positive electrodes of manganese dioxide have long been used in alkaline primary cells. They normally also contain graphite as a conducting material. Various binding agents, such as cement (cf. U.S. Pat. No. 2,962,540), are often added as well. One disadvantage of these cells is that the cell voltage drops continuously during discharge.

Cells containing mercuric oxide or silver oxide as positive electrodes are usually noted for good voltage stability during discharge. It has been found, however, that during long storage, especially at high temperatures, electrodes of silver oxide or mercuric oxide tend to destroy the separator layers owing to strong oxidizing activity, thereby limiting storage life.

Furthermore, it has been found that at the beginning of discharge at very low temperatures, cells having mercuric oxide or silver oxide electrodes exhibit an undesirable voltage minimum, a so-called "voltage-dip".

Positive electrodes of mercuric oxide containing manganese dioxide or lower manganese oxides, such as $Mn_2O_3$ or $Mn_3O_4$, are also disclosed in U.S. Pat. No. 3,600,231.

German Pat. No. 2,058,768 describes a mercuric oxide electrode containing 2–10% silver oxide as a voltage indicator. In this connection, it has also been proposed to dispose the voltage indicator in the form of a second pellet resting against the side of the mercuric oxide positive electrode remote from the negative electrode. It is to be noted in this regard that silver oxide electrodes have a lower apparent specific gravity than mercuric oxide electrodes. In this arrangement, the separator is still in contact with the extremely strongly oxidizing mercuric oxide.

Positive electrodes in the form of two nested pellets have been described in U.S. Pat. No. 3,615,858 and in the corresponding German Disclosed Application (DOS) No. 1,671,745, filed on Jan. 13, 1967 and laid open to public inspection on Dec. 30, 1971. There a pellet of primary active material, e.g., of divalent silver oxide, is surrounded by a layer of a secondary active material, e.g., of monovalent silver oxide, in such a way that the current path is solely through this layer of secondary active material, so that the discharge voltage is that of the secondary active material. The purpose of this arrangement is to eliminate the discharge at two or more potentials of the primary active material.

U.S. Pat. No. 3,920,478 discloses a positive electrode of divalent silver oxide covered by a layer of oxidizable metal such as zinc, copper, silver, tin, cadmium, or lead. The aim of this arrangement is likewise to lower the potential of the divalent silver oxide. A similar arrangement is described in German Disclosed Application (DOS) No. 2,525,360, filed on June 6, 1975 and laid open to public inspection on Dec. 18, 1975.

French Patent No. 2,278,171 describes a positive electrode consisting of a mixture of manganese dioxide and nickel oxide. The electrode may be covered by a conductive metallic layer provided with small perforations, e.g., a metal screen.

Swiss Patent No. 589,944 discloses an electrode of divalent silver oxide to which amorphous carbon is admixed in order to reduce the potential. The amorphous carbon may also be applied to the silver oxide electrode as a separate layer.

It is an object of this invention to provide an alkaline primary cell having a positive manganese dioxide electrode which exhibits both improved electrical properties and very good storage life.

To this end, in the alkaline primary cell according to the present invention, of the type initially mentioned, the improvement comprises a positive electrode having a first depolarizer layer, facing the negative electrode and made of electrolytic γ-manganese dioxide to which 6–16% of graphite powder having a broad grain-size has been admixed, and at least one further depolarizer layer disposed adjacent to the first depolarizer layer and remote from the negative electrode, having a higher apparent specific gravity (g/cc) than the first depolarizer layer, and containing γ-manganese dioxide, mercuric oxide, or monovalent silver oxide; and a separator containing one or more membrane layers unattackable by and substantially impervious to any manganese ions dissolved in the electrolyte.

Cells according to the present invention are particularly suitable for use in electronic timepieces, medical apparatus, hearing aids, and portable communications equipment.

A preferred embodiment of the invention will now be described in detail with reference to the accompanying drawing, the sole FIGURE of which is a cross-section through a button-type primary cell according to the invention.

A positive electrode consists of a first depolarizer layer 1, beneath which there is disposed at least one further depolarizer layer 2 which differs in structure or composition from the layer 1.

In the embodiment illustrated in the drawing, only one such further depolarizer layer 2 is shown. However, the invention also embraces the concept of disposing more than one further depolarizer layer 2 beneath the first layer 1. Individual depolarizer layers or strata thereof may have curved surfaces and may exhibit unequal thicknesses from the edge of the cell to the middle thereof. When the further depolarizer layer 2 comprises a plurality of different strata, each of these strata has a different apparent specific gravity which is higher than the apparent specific gravity of the first depolarizer layer 1.

The upper layer 1 of the positive electrode, facing a negative electrode 7, is composed of electrolytic γ-manganese dioxide to which 6–16% of graphite powder having a broad range of grain-size has been added. In addition, the upper layer 1 preferably also contains a small amount, e.g., 0.25% to 2.5%, of an additive which promotes adhesion between the individual particles. It has been found that polyvinyl pyrrolidone is well suited for this purpose.

A suitable graphite powder having a broad range of grain-size may be obtained, for example, by mixing 25–75% of powdered graphite having a grain-size of predominantly 0.05–5 microns with 75–25% of flaky graphite having a flake diameter of predominantly 10–1000 microns.

Depending upon the application and the size of the cell, the layer 1 may be from 0.2 to 6 mm thick, although in most cases it will be from 0.5 to 2 mm thick. The layer 1 preferably has an apparent specific gravity of 2.4 to 2.9 g/cc. The apparent specific gravity is calculated from the sum of the component weights of the individual solid constituents divided by the total geometric volume of the layer 1.

The lower depolarizer layer 2 has a higher apparent specific gravity than the layer 1. It contains electrolytic γ-manganese dioxide, silver oxide, or mercuric oxide.

If the lower layer 2 contains mostly γ-manganese dioxide, it contains more thereof per unit of volume than does the layer 1. The apparent specific gravity of the layer 2 is then higher than that of the layer 1 by at least 0.1 g/cc. Preferably, the apparent specific gravity of the layer 2 is then between 2.8 and 3.3 g/cc. It is determined by the contemplated application and the corresponding graphite additive.

If the lower layer 2 contains monovalent silver oxide or mercuric oxide, its apparent specific gravity is correspondingly higher. If it contains mostly monovalent silver oxide, the apparent specific gravity is preferably 4 to 7 g/cc. If it contains mostly mercuric oxide, the apparent specific gravity is preferably 6 to 10 g/cc. The layer 2 may be from 0.2 to 6 mm thick.

If the lower layer 2 contains mostly monovalent silver oxide or mercuric oxide, 0.5-5% of silver powder or graphite powder may be added as a conducting material. All of the depolarizer layers, including especially the layer 1, are in contact with a cup 3.

The usual separator layers are situated above the positive electrode. They preferably consist of a first thin layer 4 of polypropylene felt or nonwoven fabric, or of the commercially available microporous polypropylene known in the trade as "Celgard". In certain embodiments, the layer 4 may be omitted. Disposed above the layer 4 are one or more nonfibrous cellulose membranes, e.g., cellophane or the product sold under the trade name "Du Pont Cellu-Film PUD-O 193". Instead of cellophane, or in combination therewith, membranes of the polyethylene-methacrylic acid graft polymer sold under the trade name "Permion" may be used. It has been found that the mentioned membranes are unattackable by and substantially impervious to any manganese ions which may be dissolved in the electrolyte. As is usual, an absorbent layer 6 of matted cotton fibers may furthermore be disposed beneath the negative electrode 7, although in certain applications the layer 6 may also be omitted.

The negative electrode 7 consists either of amalgamated zinc powder or of finely-divided cadmium. As shown in the drawing, the electrode 7 is accommodated within a cover. In the case of a negative electrode of zinc, this cover is formed of a laminate as disclosed in U.S. Pat. No. 3,657,018. The outer layer 8 of the cover consists, for example, of pure nickel having a hardness of at least 150 Vickers units, and the inner layer 9 of spring bronze having a hardness of at least 100 Vickers units. Instead of a nickel-bronze laminate, the cover may also preferably be made of a laminate consisting of an outer layer 8 of a non-rusting nickel alloy, e.g., stainless steel, having a hardness of at least 170 Vickers units, and an inner layer 9 of cooper or an alloy thereof with tin, zinc, lead, or another amalgamable metal exhibiting a high hydrogen overvoltage. The cover is elastically resilient so that it is radially deformed upon closure of the cell by bending the rim 10 of the cup 3 inwardly. The deformation of the cover occurring upon closure preferably amounts to 0.2-6% relative to the diameter of the cover. After closure, the diameter of the cover in the finished cell is smaller by at least 0.2-2% than after any possible subsequent elastic relaxation following removal of the radial pressure.

The cup 3 in which the positive electrode is accommodated consists of nickel-plated sheet steel, of pure nickel, or of a nickel alloy containing at least 65% nickel, such as the product sold under the trademark "Inconel 600" (an alloy of 75% nickel, 18% chromium, and 7% iron), as disclosed in U.S. Pat. No. 3,673,000.

Disposed between the cup 3 and the cover is a sealing ring 11 of plastic material. It may, for example, be made of nylon, of neoprene, or of the synthetic resin polymer product sold under the registered trademark "Teflon." In the case of a sealing ring 11 of nylon, it will be advantageous for certain applications to dispose thereunder an annular member 12 of neoprene. This arrangement imparts additional elasticity of the seal in the axial direction. The neoprene washer 12 may also have an L-shaped cross-section and cover the entire inner side of the sealing ring 11. It has been found that the neoprene member disposed inside the sealing ring can also retard chemical degradation of the sealing ring such as occurs at high temperatures.

The manganese dioxide-zinc cell or manganese dioxide-cadmium cell according to the present invention may be equipped with a filter electrode 13 which covers the positive electrode, as described in German Disclosed Application (DOS) No. 2,637,423, filed on Aug. 20, 1976 and laid open to public inspection on Nov. 10, 1977. On the other hand, the element 13 covering the positive electrode may equally well be an electronically conductive network as described in German Disclosed Application (DOS) No. 2,618,005, filed on Apr. 24, 1976 and laid open to public inspection on Oct. 6, 1977.

What is claimed is:

1. In a primary cell of the type having an alkaline electrolyte, a positive electrode containing γ-manganese dioxide as active material, and a negative electrode containing amalgamated zinc powder or finely divided cadmium as active material, the improvement comprising a positive electrode having
a first depolarizer layer, facing said negative electrode and made of electrolytic γ-manganese dioxide to which 6–16% of graphite powder having a broad grain-size range has been admixed, and
at least one further depolarizer layer disposed adjacent to said first depolarizer layer and remote from said negative electrode, having a higher apparent specific gravity (g/cc) than said first depolarizer layer, and containing γ-manganese dioxide, mercuric oxide, or monovalent silver oxide; and
a separator containing one or more membrane layers unattackable by and substantially impervious to any manganese ions dissolved in said electrolyte.

2. A primary cell in accordance with claim 1 in the form of a button-type cell comprising a cup in which said positive electrode is accommodated and a cover in which said negative electrode is accommodated, wherein said cup is of nickel-plated sheet steel, pure nickel, or a nickel alloy containing at least 65% nickel, and said cover is made of a laminate having an outer side of pure nickel or of a non-rusting nickel alloy and an inner side of copper or an alloy thereof with amalgamable metals having a high hydrogen overvoltage.

3. A primary cell in accordance with claim 2, wherein said cover is elastically resilient and after closure of said cell is elastically deformed in the finished said cell so that the diameter of said cover is smaller by 0.2-2% than after a possible subsequent elastic relaxation following removal of radial pressure.

4. A primary cell in accordance with claim 2, further comprising a sealing ring of nylon disposed between said cover and the rim of said cup, and an annular member of neoprene against which said sealing ring rests.

5. A primary cell in accordance with claim 1, wherein non-fibrous cellulose films are used as said membrane layers.

6. A primary cell in accordance with claim 1, wherein films of polyethylene-methacrylic acid graft polymer are used as said membrane layers.

7. A primary cell in accordance with claim 1, further comprising an electronically conductive filter electrode covering the surface of said positive electrode facing said negative electrode.

8. A primary cell in accordance with claim 1, further comprising an electronically conductive inert network covering the surface of said positive electrode facing said negative electrode.

9. A primary cell in accordance with claim 1, wherein said graphite powder of said first depolarizer layer comprises a mixture of 25-75% of powdered graphite having a grain-size of predominantly 0.05-5 microns and 75-25% of flaky graphite having a flake diameter of predominantly 10-1000 microns.

10. A primary cell in accordance with claim 1, wherein said first depolarizer layer contains 0.25-2.5% of polyvinyl pyrrolidone.

11. A primary cell in accordance with claim 1, wherein said first depolarizer layer has an apparent specific gravity of 2.4-2.9 g/cc.

12. A primary cell in accordance with claim 1, wherein said first depolarizer layer is 0.2-6 mm thick.

13. A primary cell in accordance with claim 1, wherein said further depolarizer layer contains a greater weight of $\gamma$-manganese dioxide per unit of volume than does said first depolarizer layer.

14. A primary cell in accordance with claim 1, wherein said further depolarizer layer comprises for the most part $\gamma$-manganese dioxide and has an apparent specific gravity which is higher by at least 0.1 g/cc than that of said first depolarizer layer.

15. A primary cell in accordance with claim 1, wherein said further depolarizer layer contains monovalent silver oxide or mercuric oxide and has an apparent specific gravity of 4-10 g/cc.

16. A primary cell in accordance with claim 1, wherein said further depolarizer layer is 0.2-6 mm thick.

17. A primary cell in accordance with claim 1, wherein said further depolarizer layer comprises a plurality of different strata, each of said strata having a different apparent specific gravity which is higher than the apparent specific gravity of said first depolarizer layer.

* * * * *